2,712,533

LAMP BASING CEMENT CONTAINING SODIUM SILICATE-MAGNESIUM OXIDE BONDING MIXTURE

James S. Mitchell, Philadelphia, Pa., assignor to The Borden Company, New York, N. Y., a corporation of New Jersey No Drawing. Application October 23, 1950, Serial No. 191,736

5 Claims. (Cl. 260—25)

This invention relates to non-aqueous cements; relates particularly to basing cements; and relates especially to duplex type bonding cements having a component adapted to exert adhesive power in response to a moderate baking treatment in the neighborhood of 400° F.; and a second component adapted to exert a cementing effect at a much higher temperature and to maintain its cementing power at temperatures in the neighborhood of 600° F. to 650° F.

There are many uses for non-aqueous baking cements, not the least of which is found in the cementing of the brass base to the glass bulb of incandescent lamps. Basing cements for such purposes usually involve a polymerizable resin, originally shellac or the like. Subsequently, partially polymerized resins such as the phenol-formaldehyde resins, or the urea-formaldehyde resins, or the melamine-formaldehyde resins, or the phenol-furfural resins, or the alkyd resins have been used for such purposes. These cements are customarily cured at a temperature within the range between 350° F. and 400° F., usually in a gas-heated oven or by direct application of the gas flame. For the ordinary incandescent lamp service these cements serve very well indeed. However, for some purposes, incandescent lamps are desirably operated at relatively elevated temperatures; many spotlights with high power bulbs and poor ventilation operate at temperatures at or above 600° F.; likewise in various types of large drying ovens and baking ovens it is desirable to light the interior of the ovens by incandescent lamps inside. Also, there are many ovens in use heated by infrared lamps. For such services the ordinary polymer cement does not withstand the temperature well enough to give a reasonably long lamp life.

The present invention provides a cement which is primarily a resin type of cement suitable for use in automatic lamp basing machines, which then holds the parts together in the usual way. The cement, however, contains, in addition, a second component which in part replaces the inert filler customarily used in such cements, and remains inert as long as the lamp is operated at temperatures below the breakdown point of the polymer resin cement. However, when this temperature is reached or exceeded, the second component becomes active, fuses, and then sets to produce a high temperature cement which serves to hold the parts together at much higher temperature than is possible with the ordinary basing cement. By this procedure there is thus provided a duplex bonding cement suitable for utilization in the ordinary cementing procedures, which, however, contains within itself the property of providing another type of cement, when, or if, the structure is exposed to temperatures above those sustainable by the ordinary low temperature cement.

The cement of the present invention is not, however, limited to cementing bases to lamps, but it is particularly useful in any situation in which a normal temperature may or may not be exceeded. It provides one type of cementing action for temperatures below about 400° F., and a wholly different cementing action for temperatures between about 400° F. and 600° F. or 650° F., and it is particularly useful as an adhesive for adhering glass to glass, glass to metal, metal to metal, asbestos to metal, asbestos to glass, ceramic substances to ceramics, metal to ceramics, and a wide range of similar cementing reactions. In fact, the cement of the present invention will hold together substantially any two substances which will withstand temperatures as high as 650° F.

Thus, for the primary cement, the composition of my invention utilizes a thermosetting resin which is applied as a paste and baked at a moderate temperature to set the resin. There is also included in the resin cement, in place of the ordinary inert filler, an inorganic component which upon heating to a higher temperature fuses, reacts, and sets to a hard, heat-resistant, inorganic cement mass dispersed through the body of residue from the resin cement to provide a heat-resistant holding and cementing action between the component parts.

Thus, the cement of my invention provides a two-stage cementing effect in which the first stage is obtained by the use of a thermosetting resin cement and the second stage is provided by a fusion reaction, inorganic compound cement. Other objects and details of the invention will be apparent from the following description.

In the preparation of the resin of my invention, I preferably compound together approximately equal portions of a partially polymerized thermosetting resin which may be substantially any of the well-known, heat-curable resins such as those above listed. Then into the setting resin there is added an appropriate amount, usually approximately an equal amount, of a mixture of inorganic substances which, at temperatures somewhat above the normal operating temperature of the thermosetting resin, will combine to yield a solid inorganic binder or cement to hold the component parts of a structure together. For this purpose there may be used such things as mixtures of sodium silicate in its various forms, preferably the sodium m-silicate, in admixture with an appropriate amount of marble flour or marble dust; or there may be used such mixtures as boric acid with marble flour, or the like.

Thus, for the first component of the cement of the present invention, any of the heat-setting resins may be used; and for the second component of the invention any of the mixtures which fuse at temperatures slightly above the setting point of the resin or react at such temperature to yield a hard unfusible body, either by the elimination of water of crystallization or by reaction to yield a hard oxide, may be used.

In practicing my invention there is preferably first prepared an appropriate thermosetting resin. For this purpose, depending upon the particular type of resin to be used, a mixture of the appropriate components is made. For the phenol-formaldehyde type of resin there is prepared a water solution of phenol to which is added an appropriate amount of formaldehyde (or urea, or melamine, or the like, to which is added an appropriate amount of formaldehyde if other types of resins are to be made and used), and to the mixture there is added an appropriate catalyst which in the case of phenol-formaldehyde is preferably an acid catalyst, usually sulfuric acid. The solution is stirred and heated for an appropriate length of time, usually the major portion of an hour, until condensation has reached the appropriate stage, which may be either as a water solution or a water suspension, at which point the catalyst may be neutralized if desired and the resin removed by evaporation of the water or by precipitation, as is well known to those skilled in the art. In any event, the polymerization is preferably carried to the stage at which a grindable resin is obtained, but short of the stage of complete thermal setting. When this stage is reached, particularly when a phenol-formaldehyde resin is used, the resin is preferably crushed into relatively small particles and to it is then added an appropriate amount of additional hexamethylenetetramine, and the mixture completed by careful milling in a ball mill to produce a very intimate mixture. This material cures and sets readily upon the application of heat to a temperature between 300° F. and 400° F., yet has a very satisfactory shelf life. This resin is closely similar to the standard basing cement. This resin may be used as prepared, but for most purposes it is preferably admixed with a substantial quantity of inert filler. The preferred inert filler is marble flour, in part because of its low cost. However, many other inert fillers may be used; thus, barytes (barium sulfate) or lithopone or various of the class and a wide range of other inorganic fillers and pigments may also be used.

There is then prepared an appropriate mixture of the inorganic cementing agent which is desirably admixed with the thermosetting resin. The inorganic material may be selected from any of the groups above mentioned; such substances as magnesium oxide with sodium m-silicate or boric acid with marble flour or a wide range of other substances may be used. This inorganic material is desirably mixed very thoroughly, preferably in an efficient ball mill, to obtain a very thorough dispersion of the various components in the mixture. The resulting mixture will keep, dry and cool, for considerable lengths of time, and with some mixtures the keeping time or shelf life is indefinitely prolonged.

When the bonding cement is to be used, it is desirably admixed with a small amount of solvent such as denatured alcohol to convert it into a suitable paste which can be handled with the usual automatic basing machines, or for placing the cement in the joint, seam, or connection which is to be produced. When the joint is assembled, the cement is then desirably hardened by curing at 450° F. and it may remain in this condition throughout the life of the structure if desired; or, upon application of temperatures ranging from 450° F. to 650° F., the binding action of the inorganic component is brought into play to maintain the strength of the cement bond at higher temperatures than can be withstood by the baked resin. It may be noted that a mixture containing boric acid produces, after heating to 600° F., a bond which is highly water resistant as well as strong and durable, whereas a mixture containing sodium m-silicate, while it produces a strong and durable bond, does not produce a water-proof bond but after heating to 600° F. the bond can be dissolved by water if such is desired.

The cement as prepared is particularly advantageous for the attachment of the brass screw bases onto the glass bulbs of spotlights which are required to operate for prolonged periods in reflector enclosures in which the temperature builds up to values well above 600° F., in which it is desirable that the lamp life shall be at least one thousand hours of burning and it is required that the lamp bulb and base shall remain cemented together during the entire lamp life and have sufficient strength in the cement to permit unscrewing of the lamp base from the socket at the end of the lamp life without breaking the cement joint. These requirements are excellently met by the cement of the present invention.

*Example 1*

A mixture was prepared consisting of:

|  | Parts |
|---|---|
| Phenol-formaldehyde resin | 14.0 |
| Sodium m-silicate | 14.0 |
| Magnesium oxide, light | 2.0 |

These three ingredients were ball milled.

|  | Parts |
|---|---|
| Marble flour | 67.0 |
| Rosin | 3.0 |

The five ingredients were then mortared. 3 cc. per ounce of denatured ethyl alcohol were required to form a suitable paste for basing. The above ingredients must be very thoroughly mixed, and the grinding in a ball mill produces a fine-grained homogeneous mixture which can be stored dry. To this mixture there must be added about 3 cc. of denatured alcohol per ounce of mixed powder when it is desired to use the material, the alcohol being utilized to produce a coherent, pasty mass which will stay in place in the base until the bulb had been properly positioned. When the alcohol is well mixed in, the cement applied in the base, and the bulb properly positioned, it is then baked in the usual way in a hot air oven at about 400° F., or in a gas flame, as desired.

After completion of the joint, it was tested in a torsional strength test devised to check the strength of the cement while in the joint. The finished, cooled structure showed a torsional strength in inch-pounds, in the cold, of 152; and after one-half hour in boiling water, at the boiling temperature, of 95. Upon heating to 620° F., the strength of the joint was retained and an adequate lamp life developed.

It may be noted that the synthetic resin is the primary cementing agent or binder which, however, will not stand for any length of time temperatures of from 320° F. to 620° F.; and the mixture of sodium m-silicate, magnesium oxide, and marble flour is the secondary adhesive which performs its function when temperatures of 650° F. are reached.

(In this example and in all those following, the parts of material indicated in the respective recipes are parts by weight.)

*Example 2*

A similar mixture was prepared consisting of:

|  | Parts |
|---|---|
| Rosin residue cement | 45.5 |
| Hexamethylenetetramine | 5.5 |
| Sodium m-silicate | 20.0 |

These three ingredients were ball milled, and to 30 parts of this mixture there were added 70 parts of marble flour. This material was ground in a ball mill in the same way as in Example 1, and immediately prior to use approximately 3 cc. of denatured alcohol per ounce of powder were used to form the useful paste. This cement also showed excellent strength after the initial curing of the resin, and excellent strength after heating to 600° F.; but the resistance to moisture, while substantial, is lower than is desirable for many purposes.

*Example 3*

A similar mixture was prepared consisting of the following ingredients:

|  | Parts |
|---|---|
| Phenol-formaldehyde resin | 10.0 |
| Boric acid | 20.0 |
| Rosin | 5.0 |
| Marble flour | 65.0 |

This material likewise was ball milled to the condition of a fine, uniform powder which could be stored, dry, for considerable intervals of time; and it was prepared for use by the addition of about 3 cc. of denatured alcohol per ounce of powder mixture. The cement was placed in the lamp base, the bulb adjusted, and the structure cured at 450° F. to set the resin. Bulb bases so cemented withstood soaking in water for 24 hours at room temperature without injury to the cement bond; and after from 16 to 24 hours' heating at 500° F., 700° F., and 800° F. they withstood satisfactorily a torsional pull of 60 inch-pounds, the base remaining solidly cemented to the bulb in spite of such treatment. It may be noted that boric acid shows a definitely and substantially higher resistance to moisture than does the sodium silicate of Examples 1 and 2, and shows markedly less shrinkage during heating to the higher temperatures.

Example 4

A similar mixture was prepared containing slightly more boric acid and slightly less of the setting resin, as shown in the following formula:

| | Parts |
|---|---|
| Phenol-formaldehyde resin | 8.0 |
| Boric acid | 22.0 |
| Rosin | 5.0 |
| Marble flour | 65.0 |

This formula was utilized as previously described, and showed nearly as good torsional strength.

Example 5

A mixture was prepared utilizing the rosin residue sold under the trade name of "Vinsol," according to the following recipe:

| | Parts |
|---|---|
| Rosin residue | 13.64 |
| Hexamethylenetetramine | 1.36 |
| Boric acid | 20.00 |
| Marble flour | 65.00 |

This mixture was ball milled for one-half hour to produce a fine, homogeneous mixture and was then utilized in the same way as the other resins above outlined. The cemented joint was found to be of excellent strength and durability, both after baking at 350° F. to 400° F. and after treatment at 600° F.

Example 6

Many diverse mixtures of resins may be used in this cement. Thus, a mixture containing both a phenolformaldehyde resin and a rosin residue was prepared as shown in the following recipe:

| | Parts |
|---|---|
| Phenol-formaldehyde resin | 5.00 |
| Rosin residue | 7.27 |
| Hexamethylenetetramine | 0.73 |
| Shellac | 2.00 |
| Boric acid | 20.00 |
| Marble flour | 65.00 |

This mixture was ball milled for one-half hour as before and upon test showed an excellent cementing effect, good strength after baking at 400° F., and equally good strength after heating to 600° F.

Example 7

A somewhat analogous mixture was prepared containing phenol-formaldehyde resin, ordinary rosin, and shellac as shown in the following recipe:

| | Parts |
|---|---|
| Phenol-formaldehyde resin | 10.00 |
| Rosin | 5.00 |
| Shellac | 2.00 |
| Boric acid | 20.00 |
| Marble flour | 63.00 |

This cement likewise showed excellent strength both after baking at 400° F. and after heating at 600° F.

Example 8

An alternative cement of excellent properties is produced by the following recipe:

| | Parts |
|---|---|
| Phenol-formaldehyde resin | 5.00 |
| Rosin residue | 4.55 |
| Hexamethylenetetramine | 0.45 |
| Rosin | 5.00 |
| Boric acid | 20.00 |
| Marble flour | 65.00 |

This resin likewise showed an excellent cementing effect both at low temperatures and at high temperatures.

It may be noted that the last six examples here given utilize a mixture of boric acid and marble flour as high temperature cement and filler. All of these recipes are equally effective when the boric acid is replaced by sodium m-silicate with or without magnesium oxide and marble flour as desired.

It may be noted that in each of the above recipes a small amount of solvent is desirable for improving the characteristics of the cement and to produce a paste of convenient texture and body for use in an automatic lamp basing machine. A convenient solvent is denatured alcohol, and a convenient amount is approximately 3 cc. per ounce of cement. However, a considerable variation in this amount is possible depending upon the use to which the cement is to be applied, and in some instances the solvent may be omitted entirely. Likewise, a wide range of other solvents may be used although these are usually undesirable because of a higher cost. The above examples show a convenient range of proportions of the various components of the cement, but the range indicated is suggestive only and those skilled in the art will adjust proportions, including the amount of solvent and the ratio of organic cement to inorganic cement, according to the needs of the particular cementing job in which this mixture is used.

The above recipes suggest only the use of boric acid and sodium m-silicate as the high temperature inorganic cementing agent. The invention is not, however, limited to these two cementing agents since there are various additional agents, particularly various of the phosphates. A mixture is readily prepared consisting of trisodium phosphate, disodium phosphate, and calcium carbonate which is usable in the same proportions in all of the mixtures given in the above recipes. In this instance the phosphates and the calcium carbonate remain inert until temperatures in the neighborhood of about 600° F. are reached, whereupon the phosphate melts and combines in part with the calcium carbonate to form calcium phosphate and to drive off carbon dioxide to produce a hard cement consisting of fused sodium phosphate with calcium phosphate. The melting point of this mixture can be adjusted by variation of the ratio of trisodium phosphate to disodium phosphate or by the addition by monosodium acid phosphate or even phosphoric acid if desired, the more diverse the compounds, the lower the melting point.

Various other fusible compounds will be obvious to those skilled in the art by which similar reactions are obtained.

The composition of the invention thus provides a duplex cement in which one component serves as the cementing agent at moderate temperatures and the other component serves as cementing component at higher temperatures, temperatures at which the cementing action of the first component fails, the first component being preferably a heat-setting synthetic resin, the second component being preferably an inorganic material reactive at the higher temperatures to yield a solid, heat-resistant cement.

While there are above disclosed but a limited number of embodiments of the material and process of the present invention it is possible to provide still other embodiments without departing from the inventive concept herein disclosed, and it is therefore desired that only such limitations be imposed on the appended claims as are stated therein or required by the prior art.

The invention claimed is:

1. A duplex cement consisting essentially, in combination, of a phenol-formaldehyde resin having dispersed therein a sodium silicate and magnesium oxide.

2. A composition of matter consisting essentially, in combination, of approximately equal parts of a settable phenolformaldehyde resin and a filler which is inert and an insulator at temperatures below about 300° F. and becomes a firm cement but remains an insulator at temperatures between 300° F. and 620° F., comprising sodium silicate and magnesium oxide.

3. A composition of matter consisting essentially, in combination, of approximately equal parts of a settable phenol-formaldehyde resin and a filler which is inert and an insulator at temperatures below about 300° F. and becomes a firm cement but remains an insulator at temperatures between 300° F. and 620° F., comprising sodium silicate, magnesium oxide, marble flour, and rosin.

4. A cement consisting essentially, in combination, of approximately 14 parts of a phenol-formaldehyde settable resin, 14 parts of sodium m-silicate, 2 parts of magnesium oxide, 67 parts of marble flour, and 3 parts of rosin.

5. A cement consisting essentially, in combination, of approximately 14 parts of a phenol-formaldehyde settable resin, 14 parts of sodium m-silicate, 2 parts of magnesium oxide, 67 parts of marble flour, 3 parts of rosin, and 3 cc. per ounce of mixture of ethyl alcohol.

References Cited in the file of this patent

UNITED STATES PATENTS

| | | |
|---|---|---|
| 1,896,042 | Ruben | Jan. 31, 1933 |
| 2,332,116 | Schmid | Oct. 19, 1943 |
| 2,521,614 | Valyi | Sept. 5, 1950 |

FOREIGN PATENTS

| | | |
|---|---|---|
| 556,395 | Great Britain | Oct. 4, 1943 |
| 562,268 | Great Britain | June 26, 1944 |
| 607,773 | Great Britain | Sept. 6, 1948 |